United States Patent [19]
Pries et al.

[11] Patent Number: 6,118,769
[45] Date of Patent: Sep. 12, 2000

[54] METHOD AND APPARATUS FOR VOICE INTRANET REPEATER AND RANGE EXTENSION

[75] Inventors: Michael P. Pries; Richard A. Kwolek; Walter D. Slack, all of Fort Wayne, Ind.

[73] Assignee: ITT Manufacturing Enterprises, Inc., Wilmington, Del.

[21] Appl. No.: 08/846,885

[22] Filed: May 1, 1997

[51] Int. Cl.[7] ............................... H04B 7/204; H04J 3/06
[52] U.S. Cl. .......................... 370/324; 370/508; 370/516
[58] Field of Search .................................. 370/315, 316, 370/319, 324, 445, 446, 447, 448, 503, 507, 508, 517, 518, 519, 389, 516; 375/211, 212, 214, 354, 356, 358

[56] References Cited

U.S. PATENT DOCUMENTS

| | | | |
|---|---|---|---|
| 4,745,599 | 5/1988 | Raychaudhuri | 370/348 |
| 4,774,707 | 9/1988 | Raychaudhuri | 370/447 |
| 4,796,278 | 1/1989 | Naka | 375/211 |
| 4,876,683 | 10/1989 | Suzuki | 370/501 |
| 5,537,414 | 7/1996 | Takiyasu et al. | 370/347 |
| 5,648,959 | 7/1997 | Ilyadis et al. | 370/445 |
| 5,684,801 | 11/1997 | Amitay et al. | 370/447 |
| 5,943,326 | 8/1999 | Schroderus | 370/324 |

*Primary Examiner*—Ricky Ngo
*Assistant Examiner*—Kwang B. Yao
*Attorney, Agent, or Firm*—Saul Elbaum, Esq.

[57] ABSTRACT

In a digital communications system for transmitting and receiving digital data over a CSMA-type network having a source for transmitting a source signal comprising a synchronization interval and a data interval and at least one receiver for receiving a second signal having a second synchronization interval and a second data interval corresponding to the data interval of the source signal, comprising: receiver means responsive to the source signal for synchronizing the source within the synchronization interval and providing a retransmit request signal indicative of the source signal; transmitter means responsive to the retransmit request signal for synchronizing at least one receiver within one CSMA time interval delay of the synchronization interval and for transmitting the second data interval to the at least one receiver within one CSMA time interval delay of the source data interval; and interface means for synchronizing the receiver means with the transmitter means to enable data transmission therebetween.

37 Claims, 7 Drawing Sheets

REPEATER NETWORK CONFIGURATION

REPEATER NETWORK CONFIGURATION

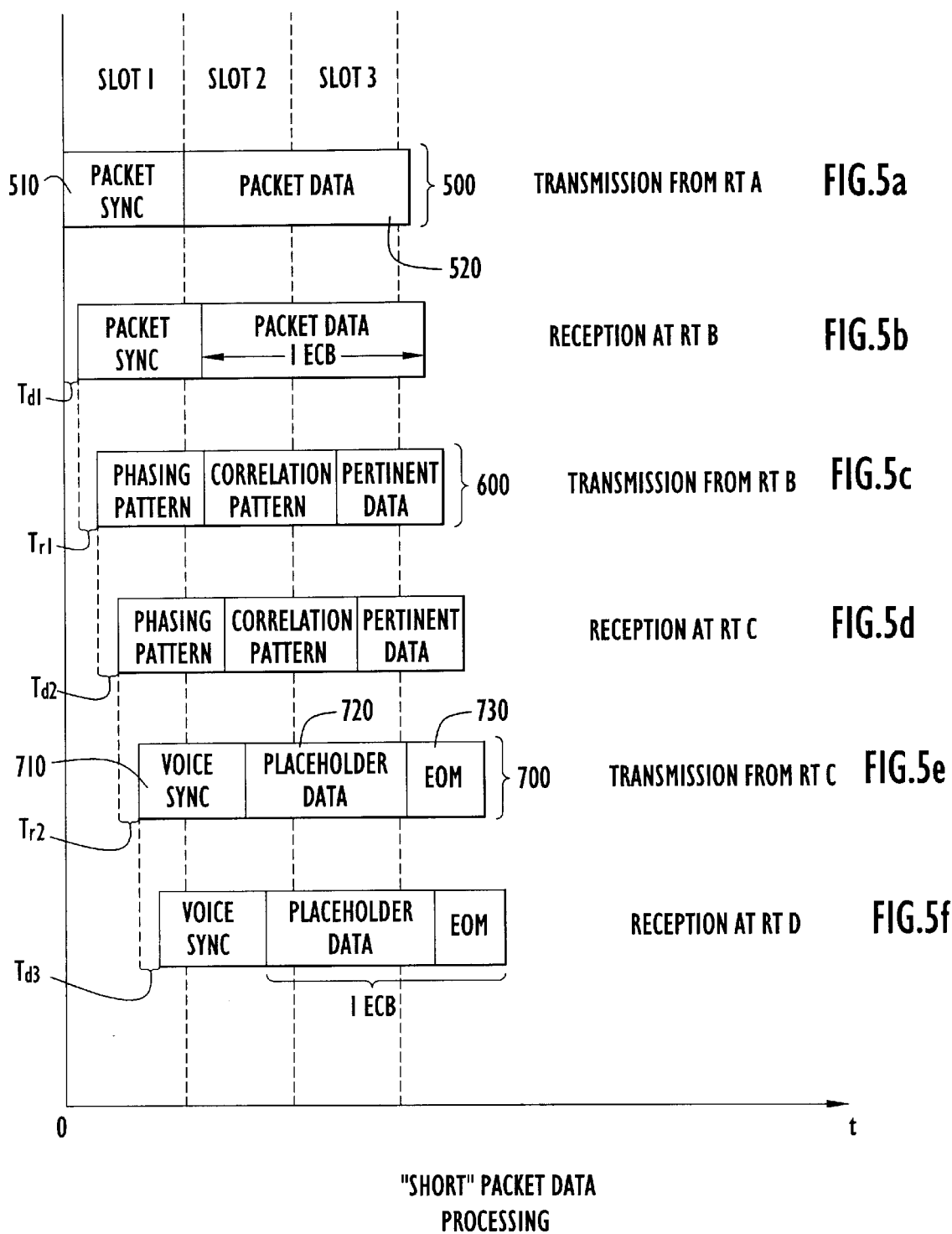

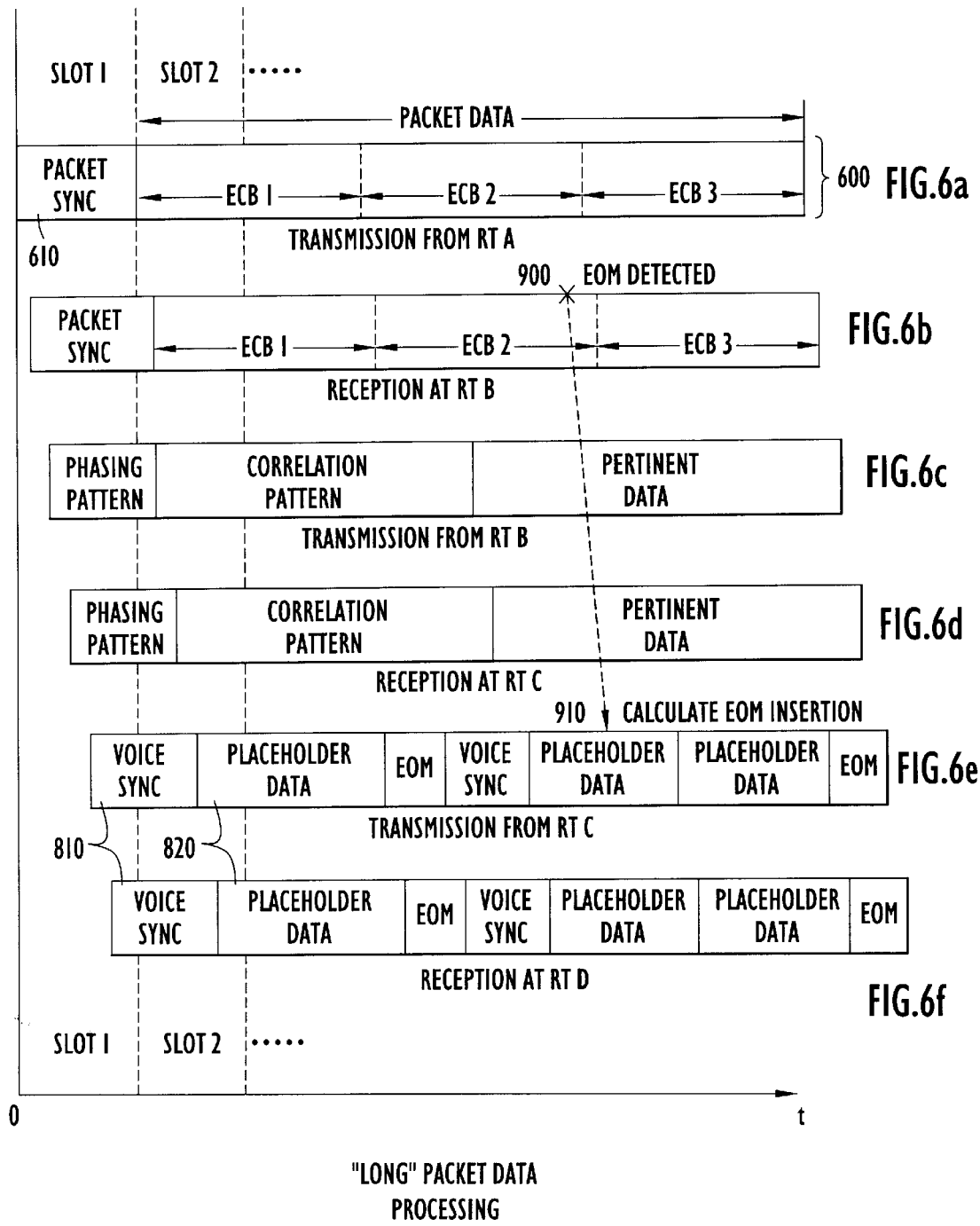

METHOD AND APPARATUS FOR VOICE INTRANET REPEATER AND RANGE EXTENSION

FIELD OF THE INVENTION

The invention relates to a communication system, and more particularly, to such systems employing repeaters which provide coverage within a voice/data packet network operating on CSMA protocols.

BACKGROUND OF THE INVENTION

Digital radio for carrier telephony appeared in the early 1970's and was limited to modest spectral efficiencies and relatively short distances. The field has grown greatly over the past decades and the use of digital radios is widespread. Consequently, networks and protocols for more efficiently scheduling, facilitating and synchronizing communication over digital radio transmission systems have also increased.

One family of protocols employed in digital communications systems are Carrier Sense Multiple Access (CSMA) protocols. CSMA protocols generally can be considered as methods for distributing management of a communication medium among users of the medium. The medium within which CSMA protocols are concerned is a single carrier communication medium, such as a transmission channel in a digital radio voice/data network. Although many variants of CSMA protocols are known, many CSMA protocols employ a scheme whereby each node sharing the communication medium is assigned a random time slot during which the node may initiate transmission provided no other node has already begun a transmission. The set of time slots for all nodes is synchronized to within one propagation time interval with the trailing edge of a carrier signal that follows the end of a transmission on the communications medium. Under this scheme, nodes on the network must maintain strict transmission and reception time interval requirements in order to effectively communicate via the network.

Although voice/data packet networks employing CSMA principles are used in digital radio communications systems, such communications have been problematic. For instance, communications become difficult once a radio is out of range or out of the line of sight. Although a radio receiver may be in range to receive a communication from a radio transmitter, it cannot receive a signal through a barrier (e.g., a mountain) from a transmitter located on the other side of the barrier. In order for the radio transmitter to communicate with the receiver, a repeater or retransmitter located at the barrier must be used to receive the transmitted signal and then retransmit the information to the receiver.

Currently, a retransmit receiver radio processes received data from the transmitter radio after receiving a synchronization sequence and sends the data as an asynchronous stream over a retransmit interface to a retransmit transmitter. During this time interval, the retransmit transmitter must wait before it transmits a synchronization sequence to the radio receiver, along with the asynchronous data stream. This method proves problematic in a voice/data packet network employing a CSMA contention interval with slots of time to manage network access. The retransmitter incurs an intolerable amount of delay when considering the CSMA contention interval. This delay disturbs the CSMA contention interval and causes the radio transmitter and radio receiver to be out of CSMA synchronization with each other because the delay causes the retransmitter to have a small probability of capturing the network within the appropriate time interval. This degrades the performance across the network and ultimately prevents communication between the transmitter and receiver. Consequently, it is extremely desirable to have an improved system for retransmitting digital radio signals within a CSMA network in such a way as to maintain synchronization on both sides of the retransmitter in order to facilitate voice/data communications.

SUMMARY OF THE INVENTION

It is an object of the present invention to provide a digital communications system for transmitting and receiving digital data over a CSMA-type network having a source for transmitting a source signal comprising a synchronization interval and a data interval and an at least one receiver for receiving a second signal having a second synchronization interval and a second data interval corresponding to said data interval of said source signal, comprising: receiver means responsive to said source signal for synchronizing said source within said synchronization interval and providing a retransmit request signal indicative of said source signal; transmitter means responsive to said retransmit request signal for synchronizing said at least one receiver within one CSMA time interval delay of said synchronization interval and for transmitting said second data interval to said at least one receiver within one CSMA time interval delay of said source data interval; and interface means for synchronizing said receiver means with said transmitter means to enable data transmission therebetween.

It is a further object of the present invention to provide an inventive method for transmitting and receiving digital data over such a network by performing the steps of: synchronizing the source with a retransmit receiver; receiving the source data interval at the retransmit receiver; providing a request retransmit signal responsive to the source signal; synchronizing a retransmit transmitter with the retransmit receiver; receiving the request retransmit signal at the retransmit transmitter over an interface means; synchronizing the receiver with the retransmit transmitter within one CSMA time interval delay of the source signal synchronization interval; and transmitting the second data interval to the receiver within one CSMA time interval delay of the source signal data interval.

BRIEF DESCRIPTION OF THE DRAWINGS

The invention is to be explained in more detail below based on an embodiment, depicted in the following figures where:

FIG. 5a is a temporal illustration of short packet data transmission of the original message from the source outstation.

FIG. 5b is a temporal illustration of short packet data transmission of the original message received at the retransmit receiver;

FIG. 5c is a temporal illustration of short packet data transmission of the retransmit request message transmitted;

FIG. 5d is a temporal illustration of short packet data transmission of the received retransmit request message;

FIG. 5e is a temporal illustration of short packet data transmission of the retransmitted message;

FIG. 5f is a temporal illustration of short packet data transmission of the received retransmitted message at the receiver outstation;

FIG. 6a is a temporal illustration of long packet data transmission of the original message from the source outstation.

FIG. 6b is a temporal illustration of long packet data transmission of the original message received at the retransmit receiver;

FIG. 6c is a temporal illustration of long packet data transmission of the retransmit request message transmitted;

FIG. 6d is a temporal illustration of long packet data transmission of the received retransmit request message;

FIG. 6e is a temporal illustration of long packet data transmission of the retransmitted message; and FIG. 6f is a temporal illustration of long packet data transmission of the received retransmitted message at receiver outstation.

DETAILED DESCRIPTION OF THE INVENTION

Figure 1:
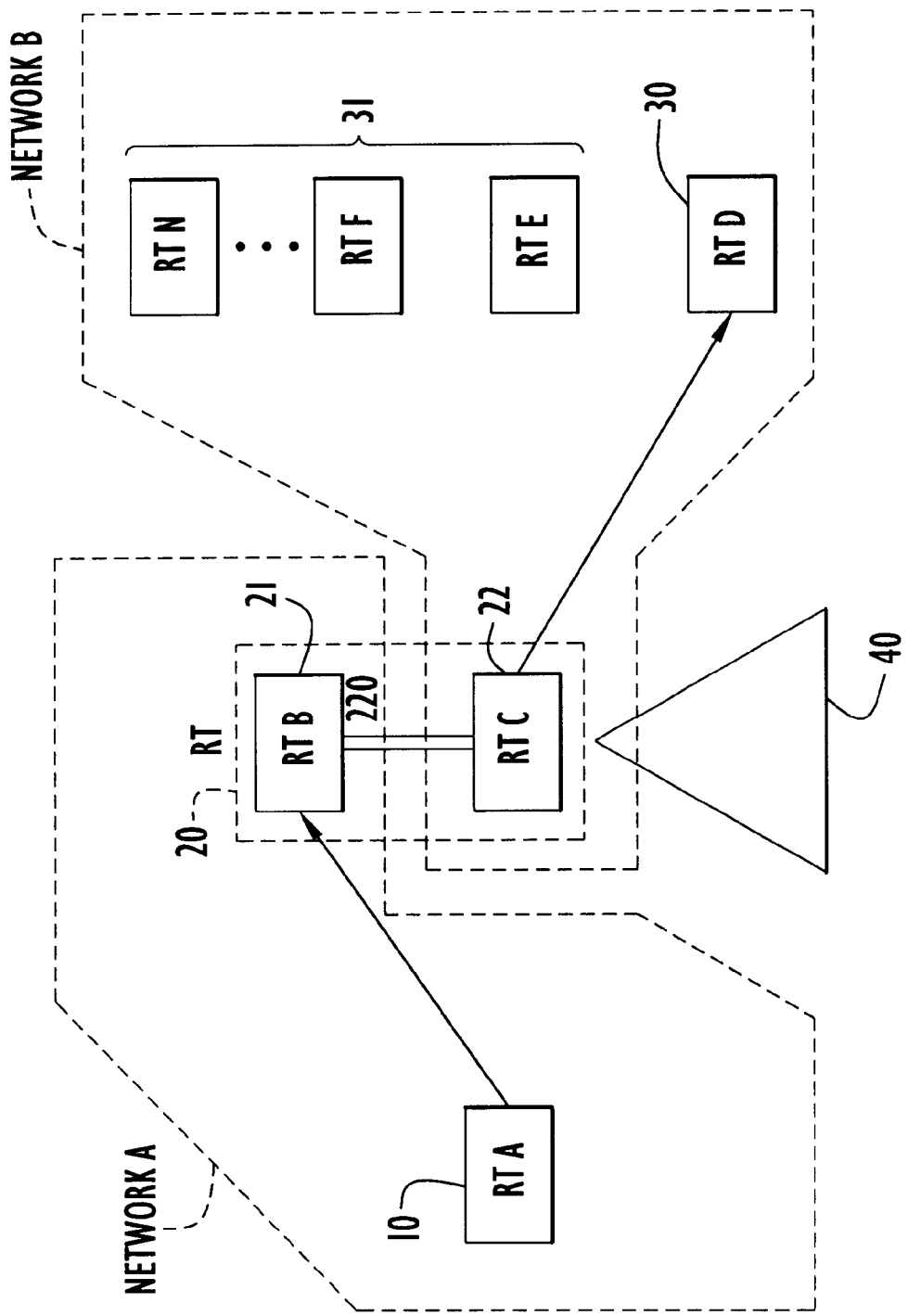
FIG. 1 shows a graphical representation of the repeater network configuration.
Figure 1A:
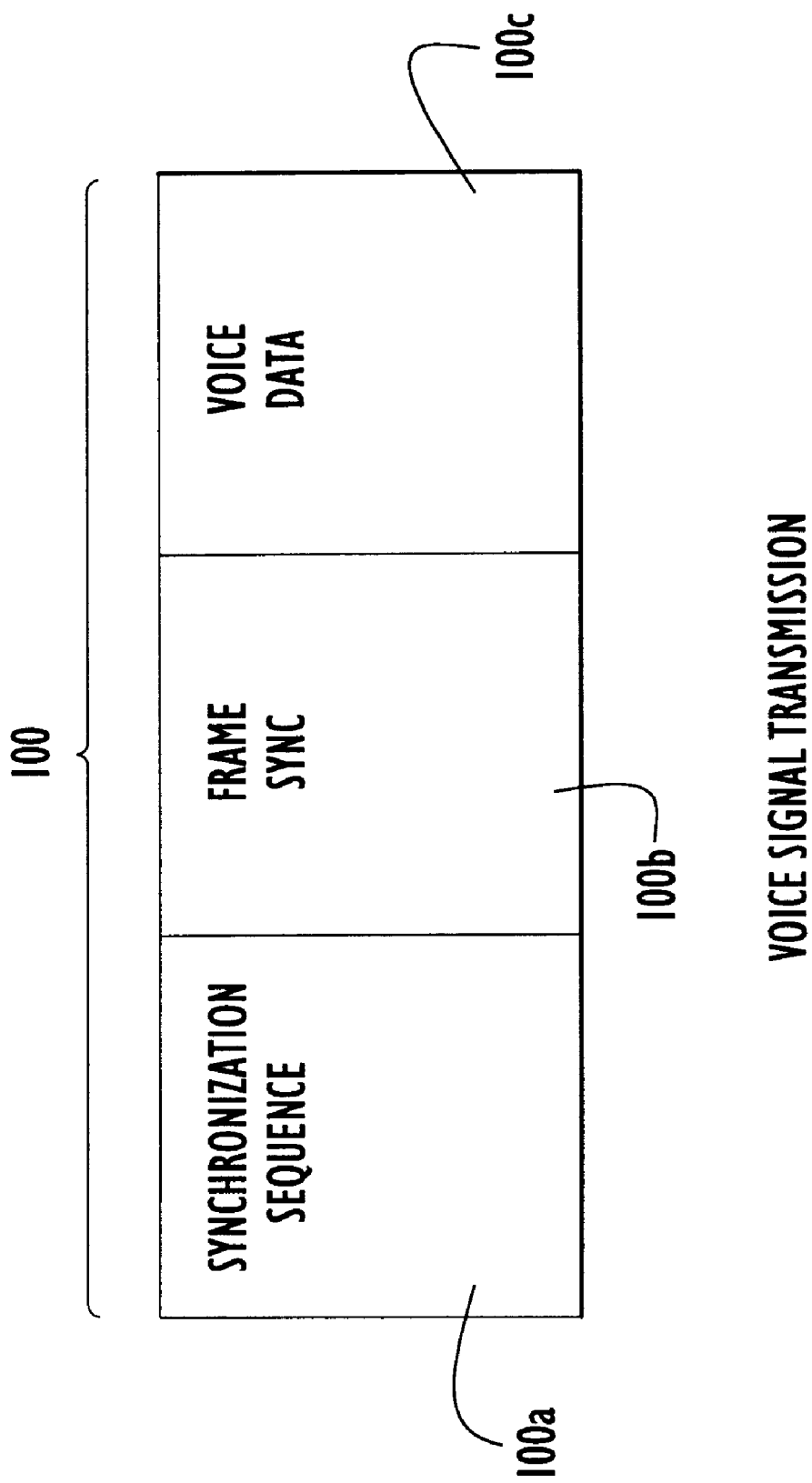
FIG. 1a shows the message format of the original transmitted digital signal.
Figure 2:
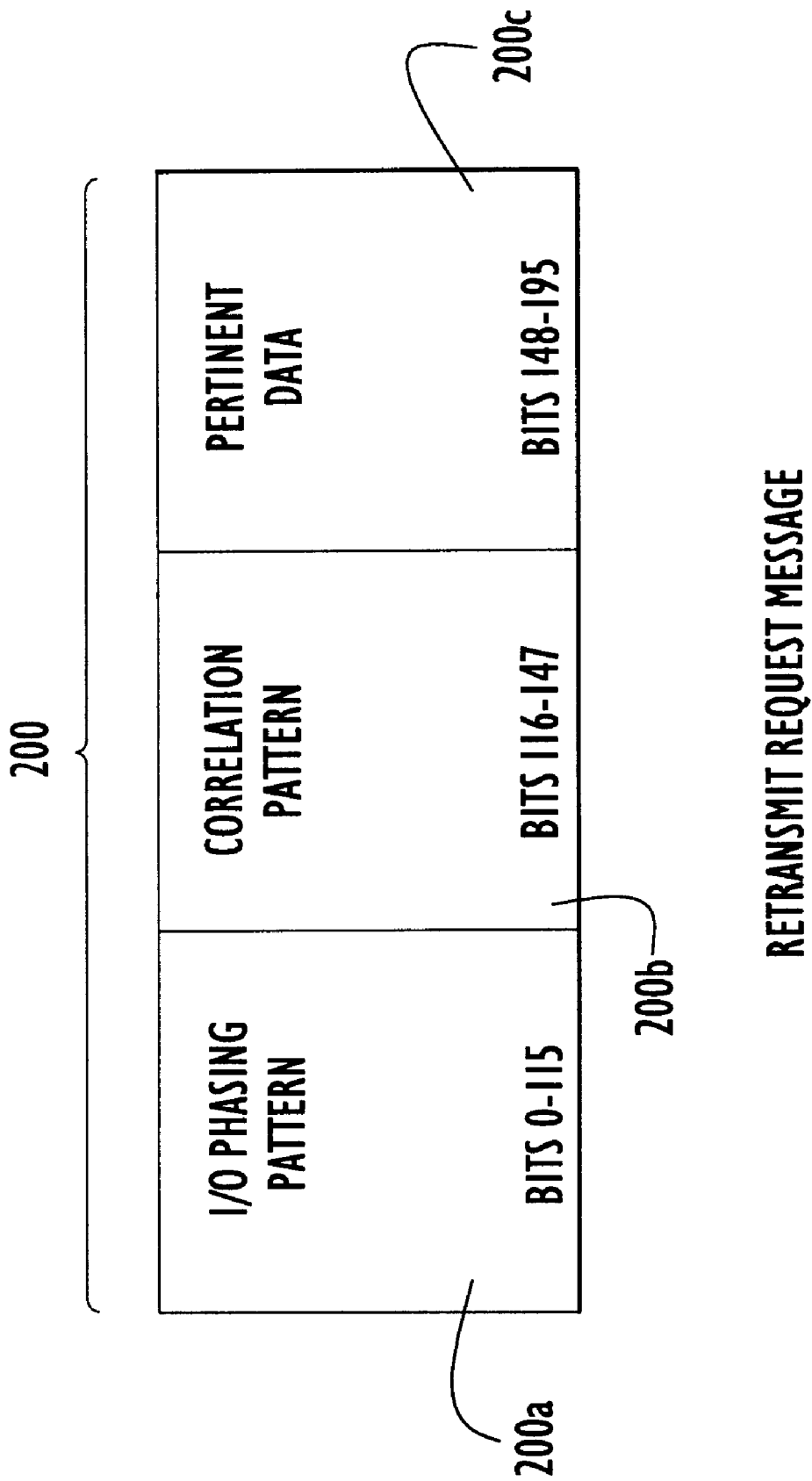
FIG. 2 shows the message format of the retransmit request message.
Figure 3:
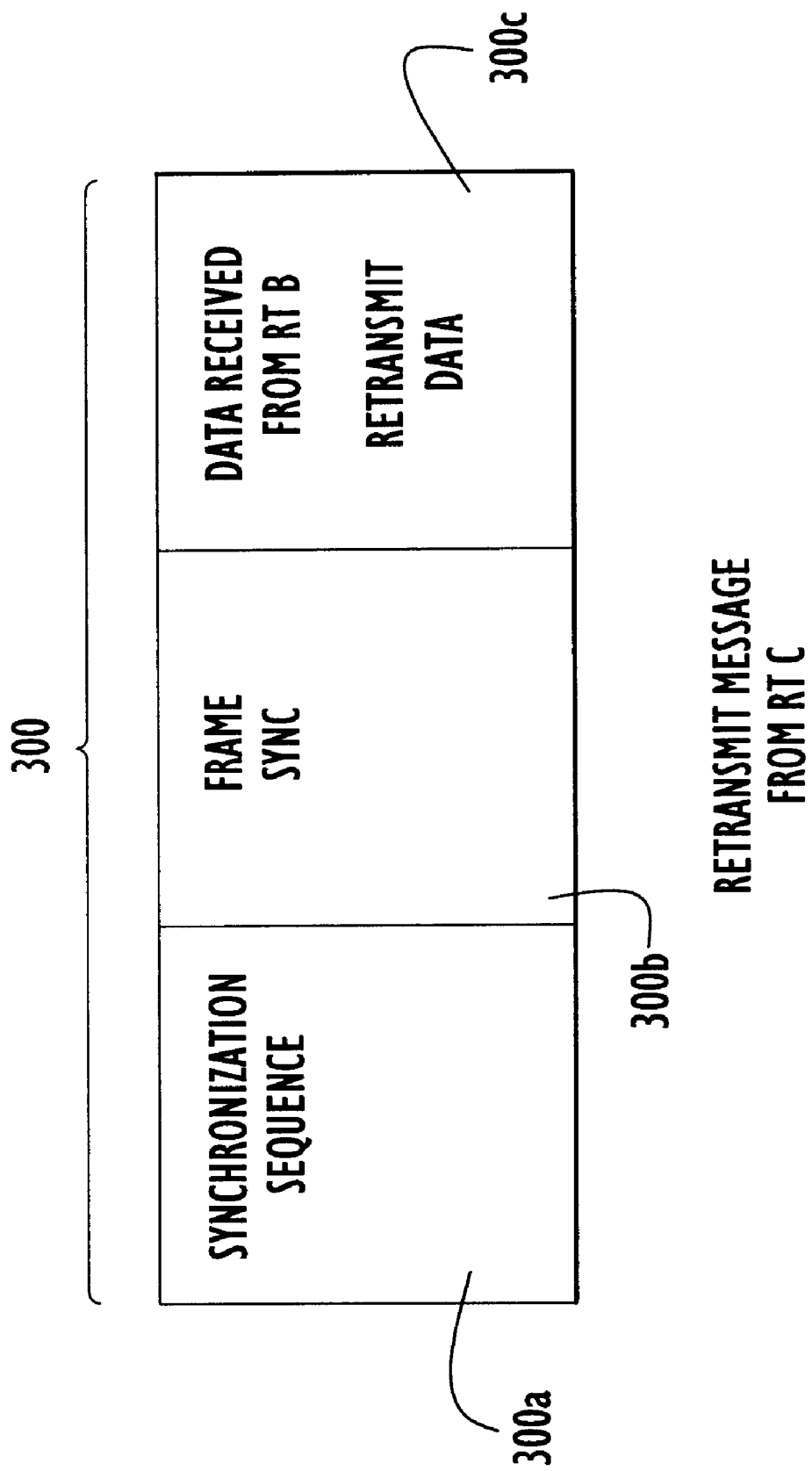
FIG. 3 shows the message format for the early synchronization processing.
Figure 4:
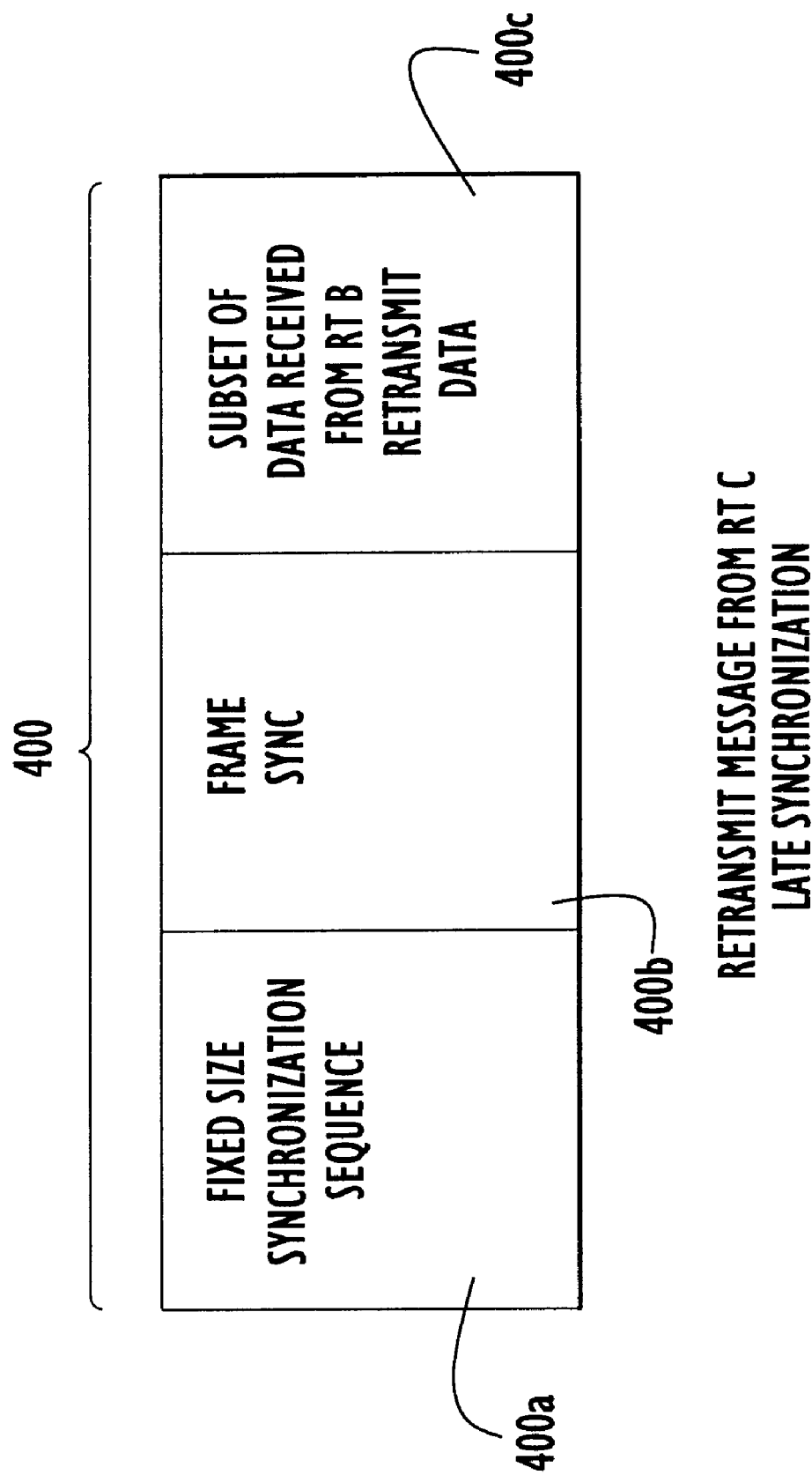
FIG. 4 shows the message format for late synchronization processing.

As illustrated in FIG. 1, a retransmit station or repeater (RT) 20 is positioned between outstation A radio (RT A) 10 and outstation D radio (RT D) 30 on barrier 40, and provides communication between radios on one side of the network (illustrated as network A) with those on the other side of the network (illustrated as network B). It is within the scope of this invention that a plurality of receiver radio outstations 31 identified as RT E, RT F, . . . ,RT N may receive the transmitted data from RT A in the same manner as will be described for outstation RT D. A retransmit receiver 21 (RT B) and retransmit transmitter 22 (RT C) are included within the retransmit station 20. While FIG. 1 illustrates a triangular barrier 40, it is within the scope of the invention that the barrier be any element which prevents or interferes with transmission between RT A and RT D, including mere distance of the transmitter from the receiver. Outstation RT A 10 initiates communication by transmitting a voice signal 100 comprising a synchronization portion 100a, frame sync 100b, and voice data 100c over CSMA-type network A, as illustrated in FIGS. 1 and 1a. Upon receiving transmission voice signal 100 from outstation RT A, the retransmit receiver RT B 21 synchronizes with RT A and performs bit adjustments to the received voice data 100c from signal 100 as a result of the received frame sync 100b to provide proper alignment of RT C's data clock with the data being sent from RT A. RT B immediately assembles a retransmit request message 200 for delivery to the retransmit transmitter RT C. The retransmit request message 200 contains data necessary to inform the retransmit transmitter RT C as to: 1) where to start a synchronization sequence; 2) information about the time of the original transmission; and 3) information about bit and frame alignment of the original transmission. Request retransmit message 200 is output by RT B to RT C over retransmit interface 220 and constructed similar to the format illustrated in FIG. 2. The 1/0 bit sync Phasing pattern 200a allows RT B and RT C to synchronize their internal data clocks together, thereby enabling correct recovery of Correlation Pattern 200b and Pertinent Data 200c at RT C. Pertinent Data 200c permits RT C to build the required fast synchronization sequence for transmission to RT D. Correlation Pattern 200b enables RT C to both bit and frame align the original data stream 100c included in signal 100 from RT A with the data transmitted by RT C. This alignment is necessary for proper reconstruction of the original data embedded in RT C's transmission to RT D. Receipt of retransmit request message 200 and clock synchronization with RT B within one CSMA time interval delay enables RT C to initiate transmission to RT D within one CSMA time interval delay of network A's original transmission from RT A. Furthermore, achieving network B synchronization of RT C with RT D within the one CSMA slot delay of Network A synchronization of RT A with RT B therefore synchronizes both nets and permits data reception and recovery of the original transmitted voice data 100c to occur at RT D. Accordingly, this means that RT C will always be at most one CSMA time interval delayed from the original signal reception by RT B. This one CSMA slot delay permits networks A and B on both sides of the retransmit station to maintain CSMA synchronization, thereby allowing communications between RT A and RT D across the networks. A novel approach for ensuring that synchronization between networks A and B occurs within one CSMA time interval delay is provided through the relative synchronization sequences at the interface 220 between RT B and RT C. As previously described, based on the information received from RT B, RT C transmits a synchronization sequence to RT D designed to achieve a high probability of network B capture within the one CSMA slot time delay. In response to RT B's request retransmit message 200, the retransmit transmitter RT C generates output signal 300 to RT D having a modified transmit sync message 300a, applies frame sync 300b, and appends the received data portion 200c from RT B as retransmit data 300c, as illustrated in FIG. 3. The transmit sync 300a and frame sync 300b account for transmit bit timing differences between the original transmission 100 from RT A and the retransmission 300 from RT C. When RT B achieves reception early in RT A's synchronization sequence, the retransmit transmitter RT C will have sufficient time to transmit synchronization sequence 300a as illustrated in FIG. 3 to enable synchronization with RT D in order for RT D to receive the data portion 300c of message 300. However, when RT B achieves reception late in RT A's synchronization sequence, RT C may not have sufficient time to transmit synchronization sequence 300a and acquire RT D within the necessary 1 CSMA slot interval delay. In this case, RT C transmits a fixed size message sync 400a, shown in FIG. 4, which is optimized for CSMA. As previously described, RT C is made aware of the time of the original transmission synchronization upon receipt of retransmit request message 200. Recognition of late synchronization requires RT C to drop a front portion of the voice data received from RT B to allow enough time for the fixed synchronization sequence 400a to be transmitted. As illustrated in FIG. 4, a subset 400c of the original data message from RT A is then transmitted to RT D. In all cases, the message synchronization sequence (300a/400a), frame sync data (300b/400b) and voice data (300c/400c) must maintain the one CSMA slot delay between the original data from the outstation (RT A) and the retransmitted data from RT C. This provides the required CSMA synchronization to be maintained. Retransmission of the original data message from RT A within one CSMA slot delay prohibits reformatting of data at either the retransmit receiver RT B or the retransmit transmitter RT C. Key to this requirement is the movement of data within retransmit station 20 (RT B and RT C) on a bit by bit basis. Retransmit station 20 handles all data in a raw format identical to the over the air waveform structure of the original transmission. This requires knowledge of the exact location of the first data bit transferred from RT B to RT C. In order to line up the data received from RT B, RT C uses the correlation pattern 200b to determine where the data starts in the Pertinent Data portion 200c from RT B. The first bit of retransmit data will be at a known distance from the correlation pattern 200b. The retransmit data bits within Pertinent Data portion 200c are then packaged within Retransmit Data portion 300c (or 400c in the case of late synchronization) for delivery to RT D. RT D will then receive the retransmitted data to reconstruct the voice data 100c from RT A.

The methods described above permit CSMA synchronization to be maintained while receiving voice data at RT B from outstation RT A. When RT A transmits packet data, additional techniques must be employed to allow communication between RT A and RT D. An inventive method for transmitting and receiving "short" packet data messages is shown FIGS. 5a–5f. These figures illustrates the digital communication sequence between RT A, RT B, RT C and RT D when transmitting and receiving "short" packet data. "Short" packet data is defined as a packet message whose data packet message portion is less than or equal to the duration of one Error Control Block (ECB). Conversely, "long" packet data consists of a packet message whose data packet portion is longer than one ECB interval. A packet waveform is transmitted in units of one ECB. Accordingly, the packet data for the packet waveform will be segmented into ECB units. FIGS. 5a and 5b illustrate the case where RT A transmits and RT B receives a "short" data packet message. The transmission and reception, as illustrated, are temporally offset by the nominal transmission delay Td1 from RT A to RT B. For convenience, it will be shown that each subsequent transmission and reception will incur nominal transmission delays Td2 and Td3 for reception at RT C and RT D respectively, although in practical terms, this may not be the case. Similarly, Tr1 and Tr2 illustrate the response delays between receipt of a message and transmission of a subsequent message responsive to the initial received message. A "short" packet message 500 comprising a packet synchronization message portion 510 and a data packet message portion 520 is transmitted from RT A to RT B. In response to packet synchronization message 510, RT B synchronizes with RT A in order to receive data packet data 520 as shown in FIG. 5b. At this point, network A synchronization of RT A with RT B has been achieved. RT B then transmits to RT C a request retransmit message as shown in FIG. 5c. The time delay between receiving message 500 and responding with message 600 is RT B's response time indicated as Tr1. FIG. 5d illustrates the propagation time delay Td2 incurred upon RT C's receipt of message 600. FIGS. 5e and 5f show that, upon notification by RT B, RT C synchronizes with RT B and prepares a voice message 700 comprising a voice synchronization message 710 and a place holder data transmission 720 using the fast synchronization sequence method to capture the RT D network B within a one CSMA slot delay of the RT A–RT B network A synchronization, thereby synchronizing both nets. RT C transmits place holder data comprising frame synchronization and predetermined voice formatted data for the duration of substantially one ECB, inserting a voice End of Message (EOM) after the placeholder data of appropriate duration to fill the remaining portion of the ECB. RT B informs RT C over the RT B–RT C interface that the transmission is complete. In response, RT C ceases further communication with RT D. As is well known in digital communications, an EOM detection causes a system to terminate synchronization and hence, message reception. The receiving unit thus undergoes a state transition from a "receiving" state to a "non-receiving" state such as "idle" mode. Analogously, EOM detection by RT D causes RT D to terminate reception and hence end synchronization with RT C, thereby releasing RT D for communication with other units within networks A and B. RT D's reception of RT C's retransmission is completed at essentially the same time as the end of the ECB from RT B. A difference between the end of both receptions (i.e. reception at RT B and RT D) of within one CSMA slot delay ensures CSMA synchronization on both sides of retransmit station 20.

In the case of "long" packet message transmission, the novel "short" message technique described above is modified to acquire and maintain network synchronization to permit communication from RT A to RT D across repeater RT. FIGS. 6a–6f illustrates the digital communication sequence between RT A, RT B, RT C and RT D when transmitting and receiving "long" packet data. "Long" packet data transmission initially requires processing using the short message process described above for the first packet data portion equivalent to one ECB. FIG. 6a illustrates a transmission from RT A to RT B of a "long" data packet message 600 comprising a packet synchronization message portion 610 and a data packet message portion 620. In response to packet synchronization message 610, RT B synchronizes with RT A in order to receive data packet data 620. At this point, network A synchronization of RT A with RT B has been achieved. The "long" packet data for the packet waveform is segmented into multiple ECB units, as illustrated in FIG. 6b. In response to reception of packet data, RT B transmits to RT C a request retransmit message as shown in FIG. 6c. FIG. 6d illustrates reception of that message at RT C. FIG. 6e shows that, upon notification by RT B, RT C synchronizes with RT B and prepares a voice synchronization message 810 and a place holder data transmission 820 using the fast synchronization sequence method to capture the RT C–RT D network B within a one CSMA slot delay of the RT A–RT B network A, thereby synchronizing both nets. RT C then transmits place holder data comprising frame synchronization and predetermined voice formatted data for the duration of one ECB, inserting a voice End of Message (EOM) at the appropriate time for RT D to complete its reception at essentially the same (i.e. within one CSMA slot delay) time as the end of the first ECB from RT B, as illustrated in FIG. 6e. If RT C does not receive an EOM indication from RT B after the first ECB indicating that the transmission is complete, as will be the case for "long" packet data, RT C immediately transmits a second fast synchronization sequence to re-acquire RT D and transmit further placeholder data for the duration of another ECB, as further illustrated in FIG. 6e. RT C's initial transmission of voice sync, placeholder data and EOM corresponds to RT A's transmission of packet data of one ECB duration. After the subsequent transmission of voice sync to reacquire RT D, RT C continuously transmits placeholder data of one ECB duration to RT D, until the point where RT B recognizes an EOM from RT A and transmits this information to RT C. This ensures that outstation RT D is held in CSMA synchronization with RT A during the data packet transmission. Once RT B's reception of RT A's transmission is long enough for RT B to recognize the EOM prior to the end of reception, RT B notifies RT C that the end of the reception is pending, as illustrated in FIG. 6b item 900. With advanced knowledge of the EOM, RT C calculates when the EOM should be inserted in its transmission to RT D as shown in FIG. 6e item 910, so that both the original (i.e. RT A→RT B) and retransmit (i.e. RT C→RT D) messages will complete at approximately the same time. After this calculation, RT C inserts the EOM after the placeholder data of appropriate duration to fill the remaining portion of the final ECB. RT C then ceases further communication with RT D. Correspondingly, reception of EOM by RT D as shown in FIG. 6f causes RT D to terminate reception and hence end synchronization with RT C, thereby releasing RT D for communication with other units within networks A and B. A difference between the end of both receptions (i.e. reception at RT B and RT D) of within one CSMA slot delay ensures CSMA synchronization on both sides of retransmit station 20. Note that, for packet transmission from RT A, RT D receives "canned" voice data, such as an audible monotone, from RT C, rather than the actual packet data from RT A.

It will be understood that a person skilled in the art may make many variations and modifications to the described embodiment utilizing functionally equivalent elements to those described. Any variations or modifications to the invention described hereinabove are intended to be included within the scope of the invention as defined by the appended claims.

What is claimed is:

1. A digital communications system for transmitting and receiving digital data over a CSMA-type network having a a first communication device for transmitting a first signal comprising a synchronization interval and a data interval; and a second communication device for receiving a second signal having a second synchronization interval and a second data interval corresponding to said data interval of said first signal, comprising:

a receiver responsive to said first signal for synchronizing said first communication device within said synchronization interval and providing a retransmit request signal indicative of a timing of said first signal; and a transmitter responsive to said retransmit request signal for synchronizing said second communication device within one CSMA time interval delay of the transmission of said first signal and for transmitting said second data interval to said second communication device within one CSMA time interval delay of the transmission of said first signal.

2. The digital communications system according to claim 1, wherein said receiver includes:

a retransmit receiver having an input port for receiving said first signal, and an output port for transmitting said retransmit request signal indicative of the timing of said first signal.

3. The digital communications system according to claim 2, wherein, said retransmit request signal includes:

a clock signal;

a correlation signal; and a pertinent data signal;

wherein said correlation signal portion is indicative of the bit and frame positioning of said first data interval, and wherein said pertinent data signal includes repositioned bits representative of said first data interval.

4. The digital communication system according to claim 3, wherein, said transmitter includes:

a retransmit transmitter operable to receive said retransmit request signal and, in response, to generate said second signal comprising said second synchronization interval and said second data interval.

5. The digital communications system according to claim 4, wherein, said retransmit transmitter further includes:

sync means responsive to said retransmit request signal for comparing the time differential between the timing of synchronization of the first communication device with the retransmit receiver and the time of said first synchronization interval transmission to a predetermined threshold time duration for determining whether the synchronization timing is late or non-late.

6. The digital communications system according to claim 5, wherein said first data interval is voice data.

7. The digital communications system according to claim 6, wherein said retransmit transmitter responsive to said non-late synchronization determination generates:

said second synchronization interval comprising a fast synchronization sequence signal, and said second data interval comprising repositioned bit data representative of said first data interval.

8. The digital communications system according to claim 6, wherein said retransmit transmitter responsive to said late synchronization determination generates:

said second synchronization interval comprising a fixed synchronization sequence signal, and said second data interval comprising repositioned bit data representative of a subset of said first data interval.

9. The digital communications system according to claim 4, wherein said first data interval is packet data.

10. The digital communications system according to claim 9, wherein said retransmit transmitter further includes means responsive to said retransmit request signal for determining an End of Message (EOM) indicator.

11. The digital communications system according to claim 10, wherein said retransmit transmitter responsive to said retransmit request signal generates:

said second synchronization interval comprising a voice synchronization sequence signal, and said second data interval comprising placeholder data and EOM data.

12. The digital communications system according to claim 11, wherein said second data interval has a duration of at least one Error Control Block (ECB).

13. The digital communications system according to claim 1, wherein said second data interval further includes a frame synchronization signal.

14. A method for transmitting and receiving digital data over a CSMA-type communication network having a first communication device for transmitting a first signal comprising a synchronization interval and a data interval and a second communication device for receiving a second signal having a second synchronization interval and a second data interval corresponding to said data interval of said first signal, the method comprising the steps of:

synchronizing said first communication device with a retransmit receiver;

receiving said first data interval at said retransmit receiver;

providing a request retransmit signal responsive to said first signal;

synchronizing a retransmit transmitter with said retransmit receiver;

receiving said request retransmit signal at said retransmit transmitter;

synchronizing said receiver with said retransmit transmitter within one CSMA time interval delay of transmission of said first signal; and transmitting said second data interval to said receiver within one CSMA time interval delay of transmission of said first signal.

15. The method according to claim 14, further including the steps of:

bit and frame aligning said data interval portion of said first signal prior to the step of transmitting said retransmit request signal.

16. The method according to claim 15, wherein said first data interval is packet data.

17. The method according to claim 16, further including the step of determining the location of an End of Message (EOM) indicator in said retransmit request signal.

18. The method according to claim 16, wherein said second synchronization interval comprises a voice synchronization signal, and wherein said second data interval comprises placeholder data and an EOM indicator.

19. The method according to claim 18, wherein for said packet data first data interval having a duration of greater than on ECB, further comprising the steps of:
   terminating synchronization with said receiver after transmitting said placeholder data and said EOM indicator of one ECB duration;
   re-establishing synchronization with said receiver by transmitting a second voice synchronization signal;
   repetitively transmitting said placeholder data of one ECB duration until an EOM indicative of an end of said first data interval is determined;
   calculating the insertion point of said EOM indicator in said repetitive transmission such that termination of transmission of said second data interval to said receiver occurs within one CSMA time interval delay of said first signal data interval termination.

20. The method according to claim 16, wherein said second data interval has a duration of at least one Error Control Block.

21. The method according to claim 14, further including the steps of:
   defining a time period duration threshold for comparison with said first synchronization time beyond which synchronization of the first communication device is late;
   determining whether synchronization with the first communication device is late or non-late by comparing the time differential between the timing of synchronization of the first communication device with the retransmit receiver and the time of said first signal synchronization interval transmission with said time period duration threshold.

22. The method according to claim 21, wherein said first data interval is voice data.

23. The method according to claim 22, further including the steps of:
   responsive to said non-late source synchronization determination, performing said synchronization of said receiver by means of a fast synchronization sequence signal; and
   transmitting said second data interval comprising repositioned bit data representative of said first data interval.

24. The method according to claim 22, further including the steps of:
   responsive to said late source synchronization determination, performing said synchronization of said receiver by means of a fixed synchronization sequence signal; and
   transmitting said second data interval comprising repositioned bit data representative of a subset of said first data interval.

25. A repeater for communicating between first and second communication devices using a carrier sense multiple access (CSMA) communication protocol, wherein the first and second communication devices transmit and receive signals containing a synchronization portion and a data portion, said repeater comprising:
   a receiver configured to synchronize with the first communication device upon reception of the synchronization portion of a first signal from the first communication device, said receiver assembling a retransmit request message containing synchronization and timing information for enabling rapid retransmission of data contained in the data portion of the first signal; and
   a transmitter configured to transmit to the second communication device a second signal that includes in the data portion the data contained in the data portion of the first signal, said transmitter establishing clock synchronization with said receiver, establishing bit and frame time alignment with the data portion of the first signal, and forming the synchronization portion of the second signal in response to the retransmit request message, wherein the synchronization and timing information in the retransmit request message enables said transmitter to transmit the second signal to the second communication device within a one CSMA time interval delay of a transmission time of the first signal, thereby achieving CSMA network synchronization between the first and second communication devices.

26. The repeater of claim 25, wherein:
   the retransmit request message includes a phasing pattern, a correlation pattern and pertinent data;
   said transmitter uses the phasing pattern to synchronize an internal data clock to an internal data clock of said receiver;
   said transmitter uses the correlation pattern to both bit and frame align the data in the data portion of the first signal with the data in the data portion of the second signal; and
   said transmitter uses the pertinent data to build a synchronization sequence contained in the synchronization portion of the second signal.

27. The repeater of claim 25, wherein said first communication device is part of a first network and said second communication device is part of a second network, and wherein transmission of the second signal by said transmitter to the second communication device within one CSMA time interval delay of the transmission time of the first signal achieves network synchronization between the first and second networks.

28. The repeater of claim 25, wherein the data contained in the data portion of the first signal is voice data.

29. The repeater of claim 25, wherein the data contained in the data portion of the first signal is packet data.

30. The repeater of claim 25, wherein:
   the retransmit request message contains information indicating a transmission time at which the first signal was transmitted by the first communication device;
   said transmitter transmits the second signal to the second communication device using a standard format when said receiver achieves synchronization with the first communication device in sufficient time to permit transmission of the second signal in the standard format within one CSMA time interval delay of a transmission time of the first signal; and
   said transmitter transmits the second signal to the second communication device using a modified format when said receiver achieves synchronization with the first communication device in insufficient time to permit transmission of the second signal in the standard format within one CSMA time interval delay of the transmission time of the first signal, the modified format permitting transmission of the second signal within one CSMA time interval delay of a transmission time of the first signal.

31. The repeater of claim 30, wherein the modified format of the second signal transmitted by said transmitter includes a fixed synchronization signal.

32. A method of communication between first and second communication devices via a repeater, using a carrier sense multiple access (CSMA) communication protocol, wherein the first and second communication devices transmit and receive signals containing a synchronization portion and a data portion, the method comprising the steps of:

(a) synchronizing a receiver of the repeater with the first communication device upon reception of the synchronization portion of a first signal from the first communication device;

(b) assembling a retransmit request message containing synchronization and timing information for enabling rapid retransmission of data contained in the data portion of the first signal;

(c) conveying the retransmit request message to a transmitter of the repeater, the transmitter being configured to transmit to the second communication device a second signal that includes in the data portion the data contained in the data portion of the first signal;

(d) in response to the retransmit request message: establishing clock synchronization between the transmitter and the receiver, establishing bit and frame time alignment between the data portion of the second signal and the data portion of the first signal, and forming the synchronization portion of the second signal; and (e) transmitting the second signal to the second communication device within a one CSMA time interval delay of a transmission time of the first signal, thereby achieving CSMA network synchronization between the first and second communication devices.

33. The method of claim 32, wherein step (b) includes:

(b1) including in the retransmit request message a phasing pattern that enables the transmitter to synchronize an internal data clock to an internal data clock of the receiver;

(b2) including in the retransmit request message a correlation pattern that enables the transmitter to both bit and frame align the data in the data portion of the first signal with the data in the data portion of the second signal; and (b3) including in the retransmit request message pertinent data that enable the transmitter to build a synchronization sequence contained in the synchronization portion of the second signal.

34. The method of claim 32, wherein the first communication device is part of a first network and the second communication device is part of a second network, and wherein transmission of the second signal by the transmitter to the second communication device within one CSMA time interval delay of a transmission time of the first signal, achieves network synchronization between the first and second networks.

35. The method of claim 32, wherein step (e) includes transmitting voice data in the data portion of the second signal.

36. The method of claim 32, wherein packet data is transmitted in the data portion of the first signal.

37. The method of claim 32, wherein:

step (b) includes incorporating in the retransmit request message information indicating a transmission time at which the first signal was transmitted by the first communication device; and step (e) includes:

(e1) transmitting the second signal to the second communication device using a standard format when the receiver achieves synchronization with the first communication device in sufficient time to permit transmission of the second signal in the standard format within one CSMA time interval delay of a transmission time of the first signal; and (e2) transmitting the second signal to the second communication device using a modified format when the receiver achieves synchronization with the first communication device in insufficient time to permit transmission of the second signal in the standard format within one CSMA time interval delay of a transmission time of the first signal, the modified format permitting transmission of the second signal within one CSMA time interval delay of a transmission time of the first signal.

* * * * *